(12) United States Patent
Robbins

(10) Patent No.: US 7,143,721 B2
(45) Date of Patent: *Dec. 5, 2006

(54) REDUCING UNGULATE PRESSURE ON POST-BURN AREAS IN MOSAIC BURNS

(75) Inventor: Mark A. Robbins, Sturgis, SD (US)

(73) Assignee: Ridley Block Operations, Inc., Mankato, MN (US)

( * ) Notice: Subject to any disclaimer, the term of this patent is extended or adjusted under 35 U.S.C. 154(b) by 367 days.

This patent is subject to a terminal disclaimer.

(21) Appl. No.: 11/126,376

(22) Filed: Jul. 25, 2003

(65) Prior Publication Data

US 2005/0193955 A1 Sep. 8, 2005

Related U.S. Application Data

(60) Continuation-in-part of application No. 10/395,532, filed on Mar. 24, 2003, which is a continuation of application No. 10/059,806, filed on Jan. 28, 2002, now Pat. No. 6,561,133, which is a continuation of application No. 09/745,609, filed on Dec. 21, 2000, now Pat. No. 6,390,024, which is a division of application No. 09/266,176, filed on Mar. 10, 1999, now Pat. No. 6,244,217.

(51) Int. Cl.
*A01K 29/00* (2006.01)
(52) U.S. Cl. ................................... 119/174
(58) Field of Classification Search ............ 119/51.01, 119/51.03, 52.4, 57.8, 174, 194; D1/100, D1/110; 426/1, 250, 635, 805, 807
See application file for complete search history.

(56) References Cited

U.S. PATENT DOCUMENTS

D61,520 S   9/1922  Michalski
2,576,154 A  11/1951 Trautvetter
2,801,609 A  8/1957  Webster
3,259,106 A  7/1966  Ray et al.
3,500,795 A  3/1970  Towlerton
3,972,307 A  8/1976  Marseillan
4,329,940 A  5/1982  Humphries
4,333,956 A  6/1982  Juengst et al.
4,338,336 A  7/1982  Glabe et al.
4,463,706 A  8/1984  Meister et al.
4,784,086 A  11/1988 Hand et al.
4,986,220 A  1/1991  Reneau et al.
5,050,539 A  9/1991  Liegner
5,406,909 A  4/1995  Wenstrand
5,526,773 A  6/1996  Richardson
5,572,954 A  11/1996 Elkins (Continued)

OTHER PUBLICATIONS

Crystalyx Brand Supplements brochure, pp. 1-15.

(Continued)

*Primary Examiner*—Teri Pham Luu
*Assistant Examiner*—Elizabeth Shaw
(74) *Attorney, Agent, or Firm*—Dorsey & Whitney LLP

(57) ABSTRACT

The present invention, in one embodiment, is a method of reducing ungulate pressure on burned sub-areas within a mosaic burn area. The method comprises identifying an unburned sub-area within the mosaic burn area and providing at least one highly palatable, portable, self-limiting, animal feed supplement in the first unburned sub-area. The highly palatable, portable, self-limiting, animal feed supplement attracts the ungulates to the first unburned sub-area and increases the length of the ungulates' stay in the first unburned sub-area. The ungulates are attracted to the first unburned sub-area by the supplement in preference to the burned sub-area with new growth.

29 Claims, 6 Drawing Sheets

U.S. PATENT DOCUMENTS

| | | | |
|---|---|---|---|
| 5,622,739 | A | 4/1997 | Benton et al. |
| 5,637,312 | A | 6/1997 | Tock et al. |
| 5,758,598 | A | 6/1998 | Rothert |
| 5,862,777 | A | 1/1999 | Sweeney |
| 5,901,660 | A | 5/1999 | Stein |
| 6,053,124 | A | 4/2000 | Kolbe |
| 6,117,458 | A | 9/2000 | Morgan |
| 6,153,230 | A | 11/2000 | Corley, Jr. |
| 6,244,217 | B1 | 6/2001 | Robbins |
| 6,257,288 | B1 | 7/2001 | Davidian et al. |
| 6,390,024 | B1 | 5/2002 | Robbins |
| 6,561,133 | B1 * | 5/2003 | Robbins .................... 119/174 |
| 6,854,420 | B1 | 2/2005 | Crocker |
| 2003/0188694 | A1 | 10/2003 | Robbins |
| 2005/0081792 | A1 | 4/2005 | Robbins |

OTHER PUBLICATIONS

Beef NutriTech, New Tools to Distribute Grazing brochure.
Crystalyx Brand Supplements, Dealer Reference Manual, BGF-30.
Pasture and Forages, *Modifying livestock grazing distribution by strategic placement of cooked molasses supplements*, D.W. Bailey and G.R. Welling, Montana State University, Havre, J. Anim. Sci. vol. 76, Suppl. 1/J. Dairy Sci. vol. 81, Suppl. Jan. 1998, 740, p. 191.
*Cattle Grazing and Behavior on a Forested Range*, Leonard Roy Roath and William C. Krueger, Journal of Range Management 35(3), May 1982, pp. 332-338.
*Cattle Distribution on Mountain Rangeland in Northeastern Oregon*, R.L. Gillen, W.C. Krueger, and R.F. Miller, Journal of Range Management 37(6), Nov. 1984, pp. 549-553.
*Salt and Meal-Salt Help Distribute Cattle Use on Semidesert Range*, S. Clark Martin and Donald E. Ward, Journal of Range Management 26(2), Mar. 1973, pp. 94-97.
*Response of Livestock to Riparian Zone Exclusion*, Larry D. Bryant, Journal of Range Management 35(6), Nov. 1982, pp. 780-785, pp. 780-785.
*Management of Cattle Distribution*, Derek W. Bailey and Larry R. Rittenhouse, Rangelands 11(4), Aug. 1989, pp. 159-161.
*An Approach for Setting the Stocking Rate*, Jerry L. Holechek, Rangelands 10(1), Feb. 1988, pp. 10-14.
*Declining forage availability effects on utilization and community selection by cattle*, Michael A. Smith, J. Daniel Rodgers, Jerrold L. Dodd, and Quentin D. Skinner, J. Range Manage, 45:391-395, Jul. 1992.
*Impacts of Cattle on Strambanks in Northeastern Oregon*, J. Boone Kauffman, W.C. Krueger, and M. Vavra, Journal of Range Management 36(6), Nov. 1983, pp. 683-685.
*Livestock Impacts on Riparian Ecosystems and Streamside Management Implications . . . A Review*, J. Boone Kauffman and W.C. Krueger, Journal of Range Management 37(5), Sep. 1984, pp. 430-438.
*Factors Affecting Utilization of Mountain Slopes By Cattle*, C. Wayne Cook, Dept. of Range Science, Utah State University, Logan, pp. 200-204.
*Use of Supplemental Feeding Locations to Manage Cattle Use on Riparian Areas of Hardwood Rangelands*, Neil K. McDougald, William E. Frost, and Dennis E. Jones, USDA Forest Service Gen. Tech. Rep. PSW-110, 1989, pp. 124-126.
*Grazing Management*, John F. Vallentine, Professor of Range Science, Brigham Young University, Provo, Utah, 1990, pp. 76-105.
*Rangeland Management for Livestock Production*, Hershel M. Bell, University of Oklahoma, 1973, pp. 190-216.
*Holistic Resource Management*, Allan Savory, Library of Congress Cataloging-in-Publication Data, 1988, pp. 250-263.
*Managing Livestock Grazing on Meadows of California's Sierra Nevada*, A Manager-User Guide, Univ. Calif., Div. Agric. & Nat. Resources Leaflet 21421, pp. 1-9.
U.S. Forest Service Rocky Mountain Forest and Range Experiment Station, 1980, Utilization Gauge, An Instrument for Measuring the Utilization of Grasses, American Slide-Chart Corp., Wheaton, Ill., 3 pgs.
*Managing Livestock Grazing on Meadows of California's Sierra Nevada*, A Manager-User Guide, Cooperative Extension University of California, Division of Agriculture and Natural Resources, Leaflet 21421.
Warnert Jeannette, "UC Scientists Use Observation to Study Cow Behavior", [on line], Aug. 10, 1998, http://www.uckac.ed/press/pressreleases98/cowbehavior.htm (2pgs).
"Cow behavior studied to protect environment", [on line], Aug. 18, 1998, http://www.enn.com/news/enn-stories/1998/08/081898/cows17_23073.asp, (2pgs).
Brewer, Tracy, "Use of Dehydrated Molasses Blocks to Promote Uniform Utilization Between Burned and Unburned Areas of a Summer Pasture 2 Years Post-Burn", Study conducted on Nov. 27, 2002, (16pgs).
Bailey, Derek W., "Effectiveness of Low-Moisture Molasses Blocks and Conventional Formulations for Delivering Supplemental Minerals to Cattle on Rangelands", Final Report conducted on Apr. 15, 2001, (31pgs).
Aussibal et al., "A Way of Recovering Woodland and Heathland for Pastoral Farming in a Game and Wildlife Reserve Area", Recontres Autour des Recherches Sur Les Ruminants, Paris, France, pp. 399-402, Dec. 4-5, 2002.
Blezinger, Stephen, "Taking a Look at Liquid Feeds for Growing Cattle", www.cattletoday.com/archive/2001/Nov./CT179.shtml, 1998-2001.
Bowman et al., "Influence of Liquid Supplement Delivery Method on Forage and Supplement Intake of Grazing Beef Cows", Animal Feed Science and Technology, vol. 78, No. 3-4, pp. 273-285, 1999.
Crane et al., "Influence of Cattle Grazing on Elk Habitat Selection", Proceedings, Western Section American Society of Animal Science, vol. 52, 5 pages, 2001.
Uniblock Cattle Minerla, www.uniblokcanada.com/MineralAnalysis.htm, 2002.

\* cited by examiner

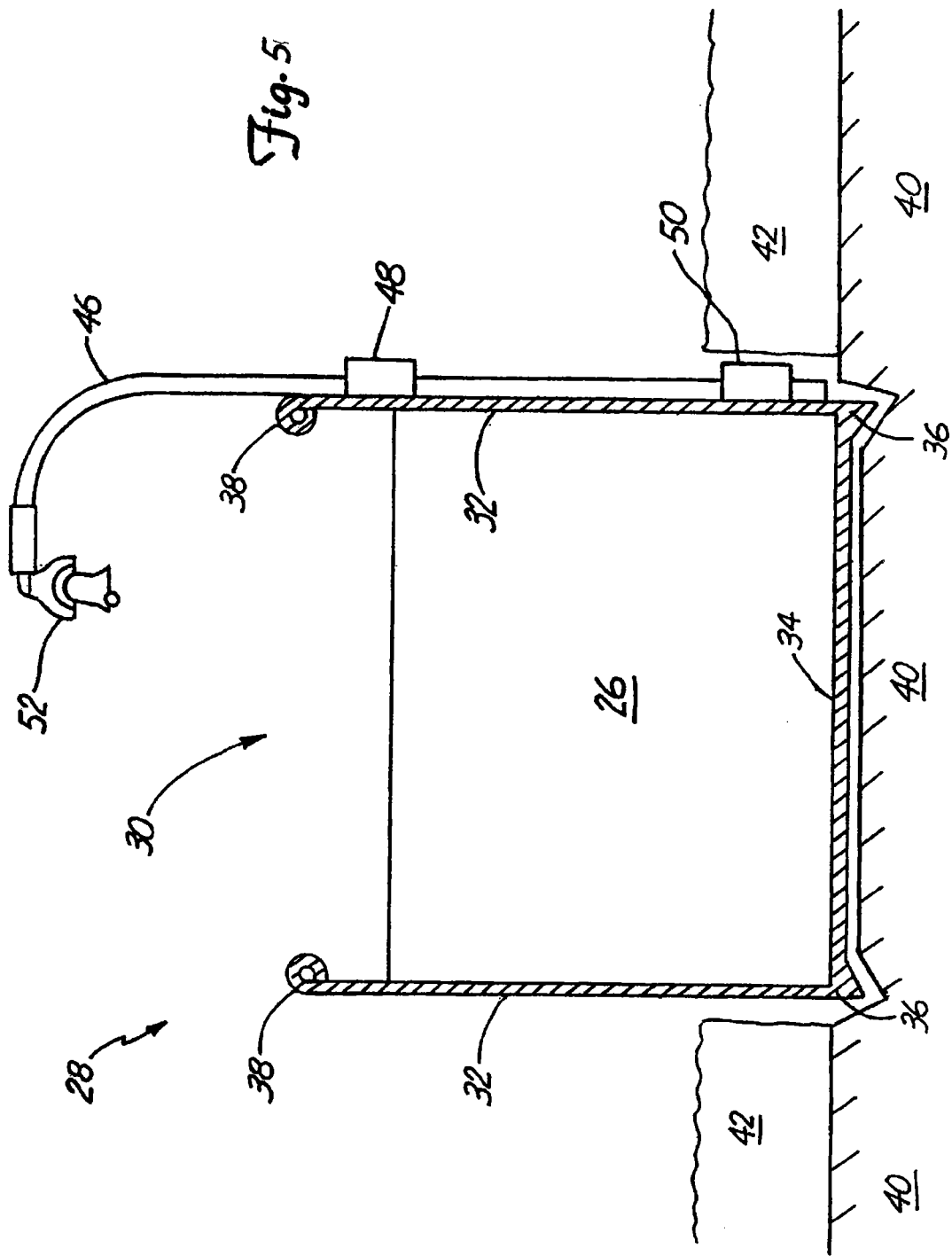

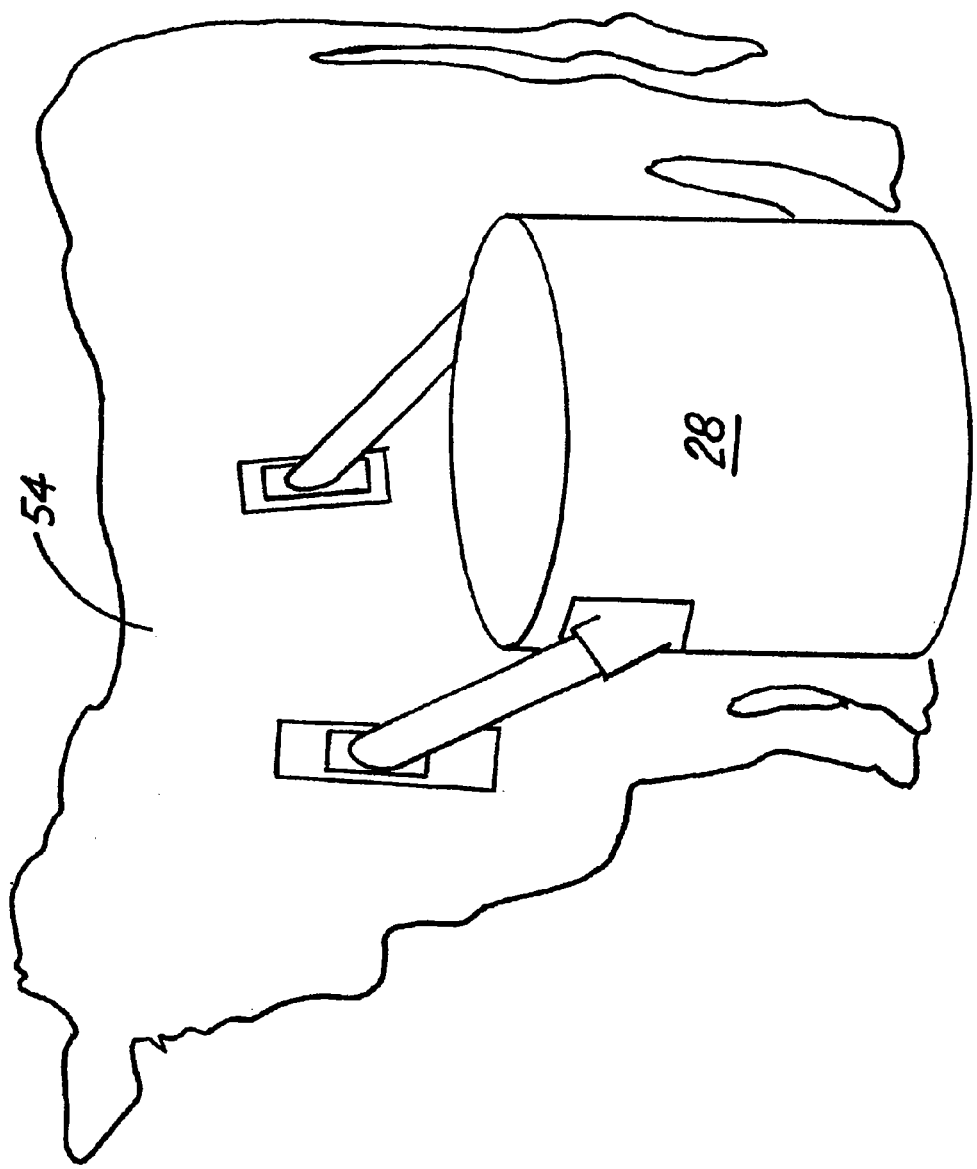

REDUCING UNGULATE PRESSURE ON POST-BURN AREAS IN MOSAIC BURNS

CROSS-REFERENCE TO RELATED APPLICATIONS

This application is a continuation-in-part (CIP) application of U.S. patent application Ser. No. 10/395,532, filed Mar. 24, 2003, which is a continuation of U.S. patent application Ser. No. 10/059,806, filed Jan. 28, 2002 now U.S. Pat. No. 6,561,133, which is a continuation of U.S. patent application Ser. No. 09/745,609, filed Dec. 21, 2000 and issued May 21, 2002 as U.S. Pat. No. 6,390,024, which is divisional of U.S. patent application Ser. No. 09/266,176, filed Mar. 10, 1999 and issued Jun. 12, 2001 as U.S. Pat. No. 6,244,217, which are all hereby incorporated by reference in their entireties.

BACKGROUND OF THE INVENTION

The present invention relates generally to a method of managing foraging areas. More particularly, the present invention relates to a method of using an animal feed supplement to manage foraging areas.

A host of habitat and non-habitat variables influences ungulate (e.g., cattle, sheep, goats, lamas, horses, deer, elk, and bison) selection of foraging areas and habitat. In foraging areas where fire is introduced, whether intentionally or otherwise, foraging patterns of ungulates are affected. For at least two years post-fire, ungulates often prefer areas that have been burned compared to those that are unburned. This is because fire burns the old, cured and dead plant materials, which are later replaced by fresh new growth in the following growth period.

Fires, whether they are wild or controlled-burn type fires, often burn in a manner that results in a "mosaic burn" pattern where the burned area comprises intermixed, adjacent burned and unburned sub-areas. Because ungulates prefer the resulting fresh new growth that soon appears in the burned sub-areas, the burned sub-areas often become over-utilized (i.e., overgrazed). Thus, the ungulates overgraze the burned sub-areas while ignoring abundant or high quality forage in adjacent unburned sub-areas. This "localized overgrazing" causes several significant problems in the context of ranching. First, it reduces the rancher's profit because it wastes forage. Second, the livestock trample the new vegetation in the burned sub-areas, making it difficult for the new growth to reestablish, mature, and go to seed. Burned sub-areas that have difficulty with the reestablishment of vegetation suffer from topsoil erosion due to wind and rain. Eroded soil runs off into nearby water sources, resulting in poor water quality. Finally, localized overgrazing prevents the most effective return of nutrients to the soil because manure is not spread to its best effect.

Because the burned sub-areas can be subject to overgrazing, ranchers are often faced with the options of either not grazing a mosaic burn area or fencing-out the burned sub-areas from the unburned sub-areas. Neither option is ideal, because both present costs to the rancher in the form of reduced grazing capacity and/or increased fencing costs. Also, both options prevent the benefits provided by moderate grazing of the burned sub-areas. Moderate grazing is beneficial because it actually helps native grasses to reestablish by breaking up grass clumps, distributing seed, and providing much-needed nutrients through the distribution of manure.

There is a need in the art for a method of controlling grazing distribution of ungulates that allows the beneficial grazing of burned sub-areas within a mosaic burn area without overgrazing the burned sub-areas.

BRIEF SUMMARY OF THE INVENTION

The present invention, in one embodiment, is a method of reducing ungulate pressure on burned sub-areas within a mosaic burn area. The method comprises identifying an unburned sub-area within the mosaic burn area and providing at least one highly palatable, portable, self-limiting, animal feed supplement in the first unburned sub-area. The highly palatable, portable, self-limiting, animal feed supplement attracts the ungulates to the first unburned sub-area and increases the length of the ungulates' stay in the first unburned sub-area. The ungulates are attracted to the first unburned sub-area by the supplement in preference to the burned sub-area with new growth.

The present invention, in another embodiment, is a method of modifying the natural foraging patterns of ungulates within a mosaic burn area that includes burned and unburned sub-areas. The method comprises supplying in a first unburned sub-area an ingestible adapted to be ingested by ungulates. In one embodiment, the ingestible attracts the ungulates to the first unburned sub-area. In one embodiment, the ingestible increases the presence of the ungulates in the first unburned sub-area. In one embodiment, the ungulates are selected from the group consisting of cattle, sheep, goats, lamas, horses, deer, elk, and bison.

The present invention, in yet another embodiment, is a mosaic burn area adapted to reduce pressure by ungulates on a burned sub-area within the mosaic burn area. The mosaic burn area comprises an unburned sub-area within the mosaic burn area and a highly palatable, portable, self-limiting, animal feed supplement located in the unburned sub-area. The animal feed supplement is adapted to attract the ungulates to the unburned sub-area and to increase a length of stay of the ungulates in the unburned sub-area.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

BRIEF DESCRIPTION OF THE DRAWINGS

FIG. 5 is a sectional view of a supplement container.

FIG. 6 is a pictorial view of a supplement container attached to an animal silhouette.

DETAILED DESCRIPTION

Figure 1:
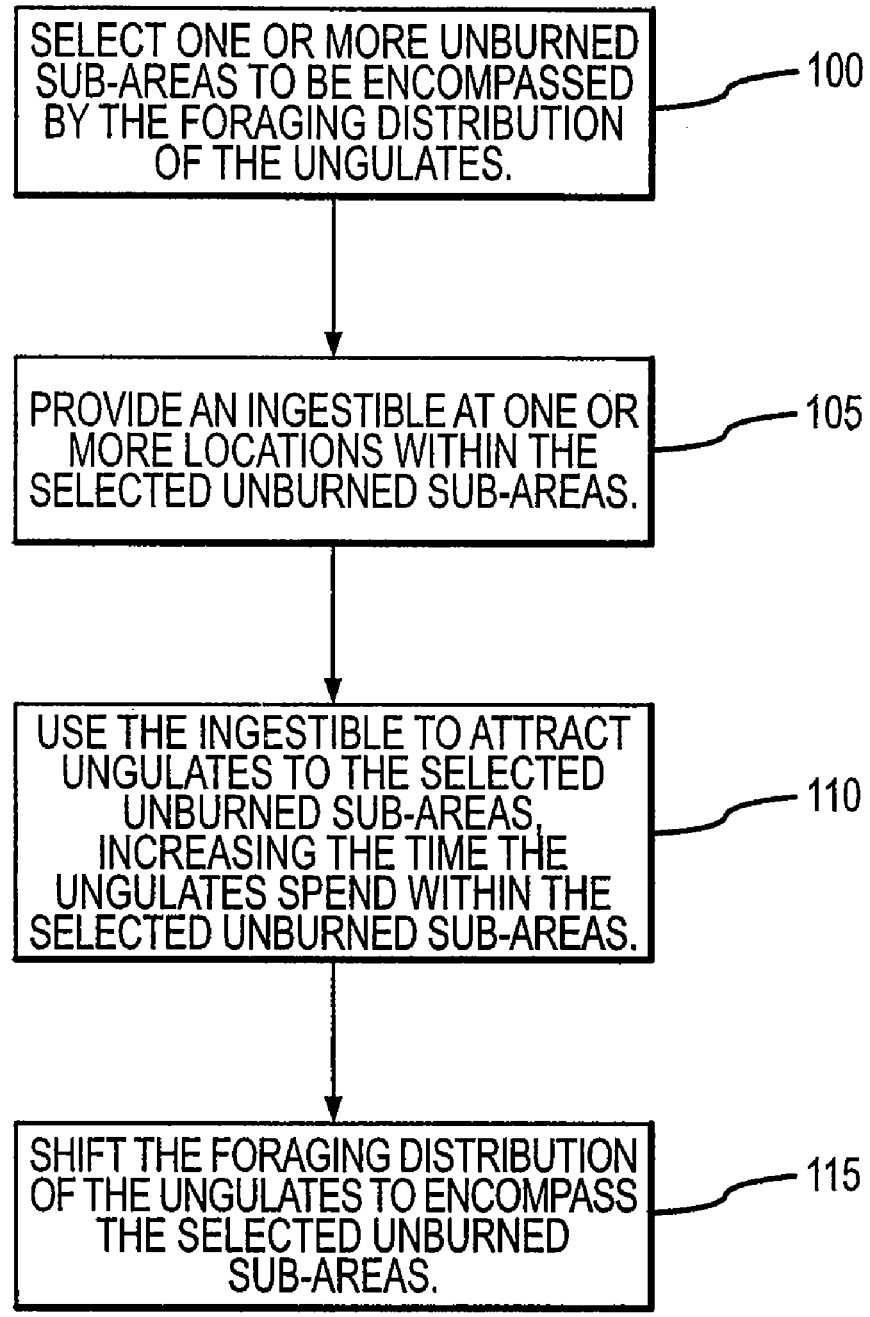
FIG. 1 is a flow diagram illustrating one embodiment of the method.

This specification discloses a method of modifying the natural foraging distribution of ungulates in a mosaic burn area to reduce ungulate foraging pressure on the burned sub-areas within the mosaic burn area. As indicated in FIG. 1 and as will be explained in greater detail later in this specification, the method, in one embodiment, is as follows. An unburned sub-area within the mosaic burn area is selected to be encompassed by the foraging distribution of the ungulates (block 100). A supplement (e.g., an ingestible such as a highly-palatable, portable, self-limiting, animal feed supplement of the type described later in this specification) is provided at a location within the selected unburned sub-area (block 105). The supplement attracts ungulates to the selected unburned sub-area and increases the time the ungulates spend within the selected unburned sub-area (block 110). The foraging distribution of the ungulates shifts to encompass the selected unburned sub-area (block 115), thereby reducing the foraging pressure on the burned sub-areas 4.

Figure 2:
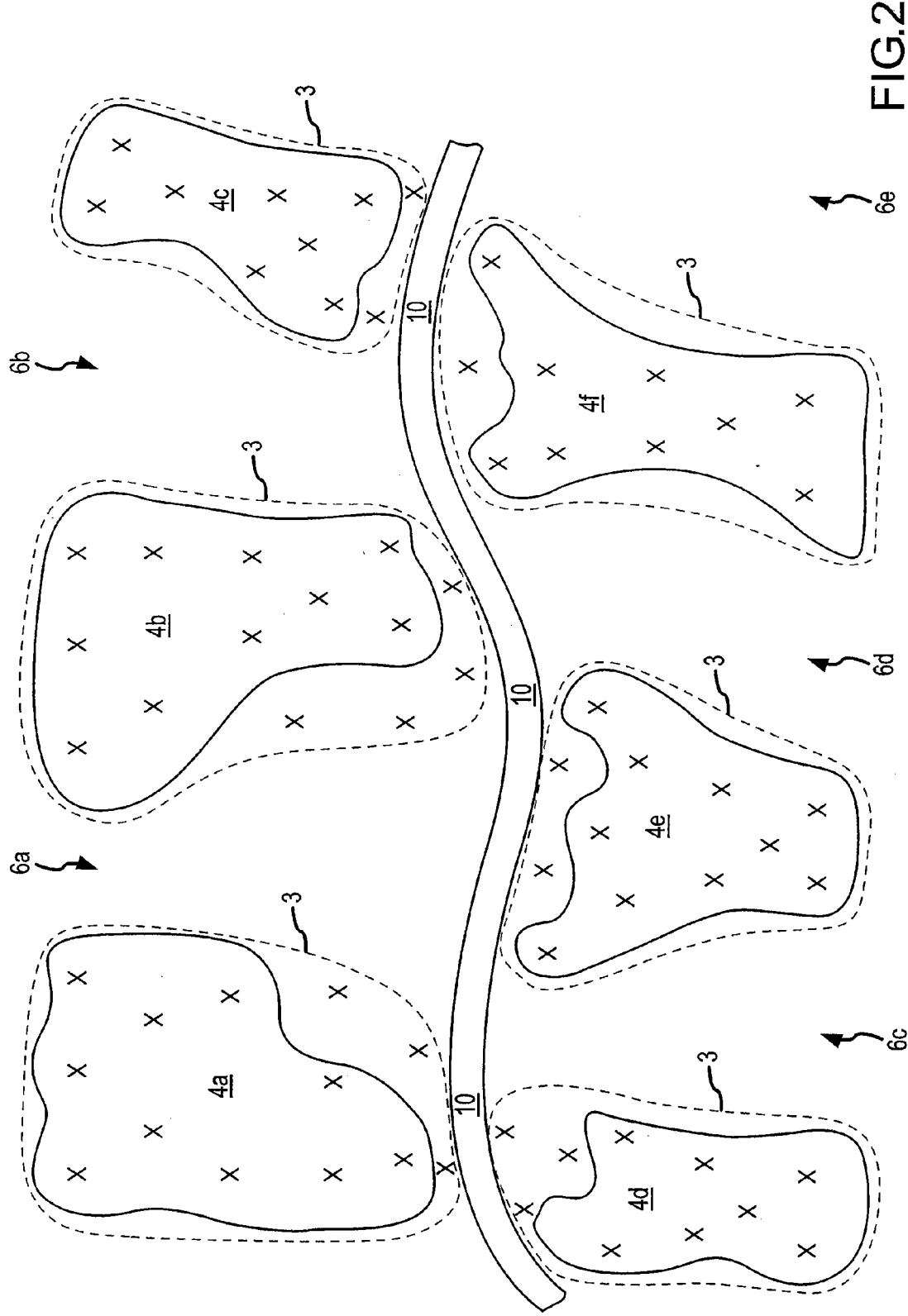
FIG. 2 is a map showing the natural foraging distribution of ungulates within a mosaic burn area of a foraging area.
Figure 3:
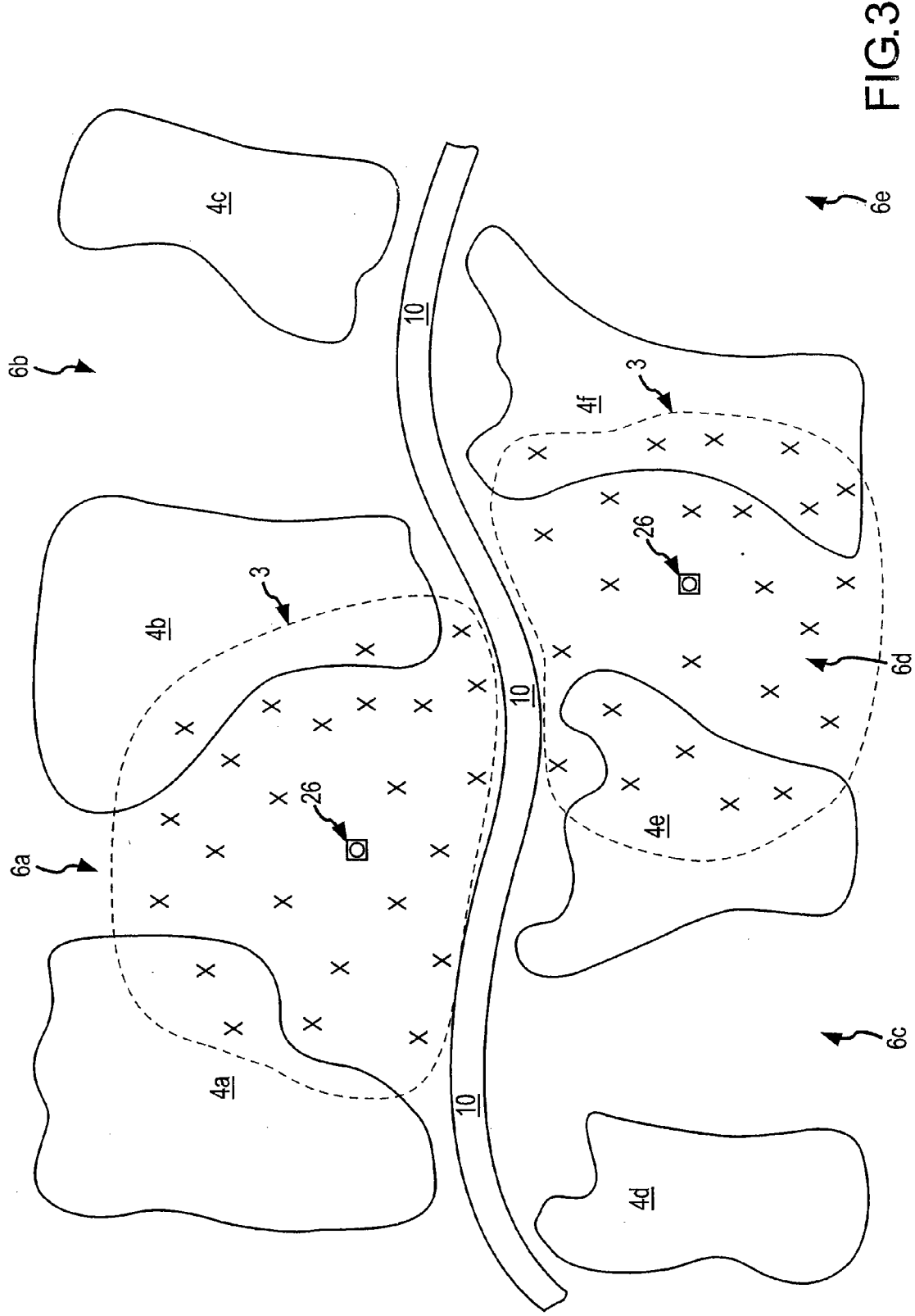
FIG. 3 is a map showing the foraging distribution of ungulates within the mosaic burn area illustrated in FIG. 1 during a first supplementation period.
Figure 4:
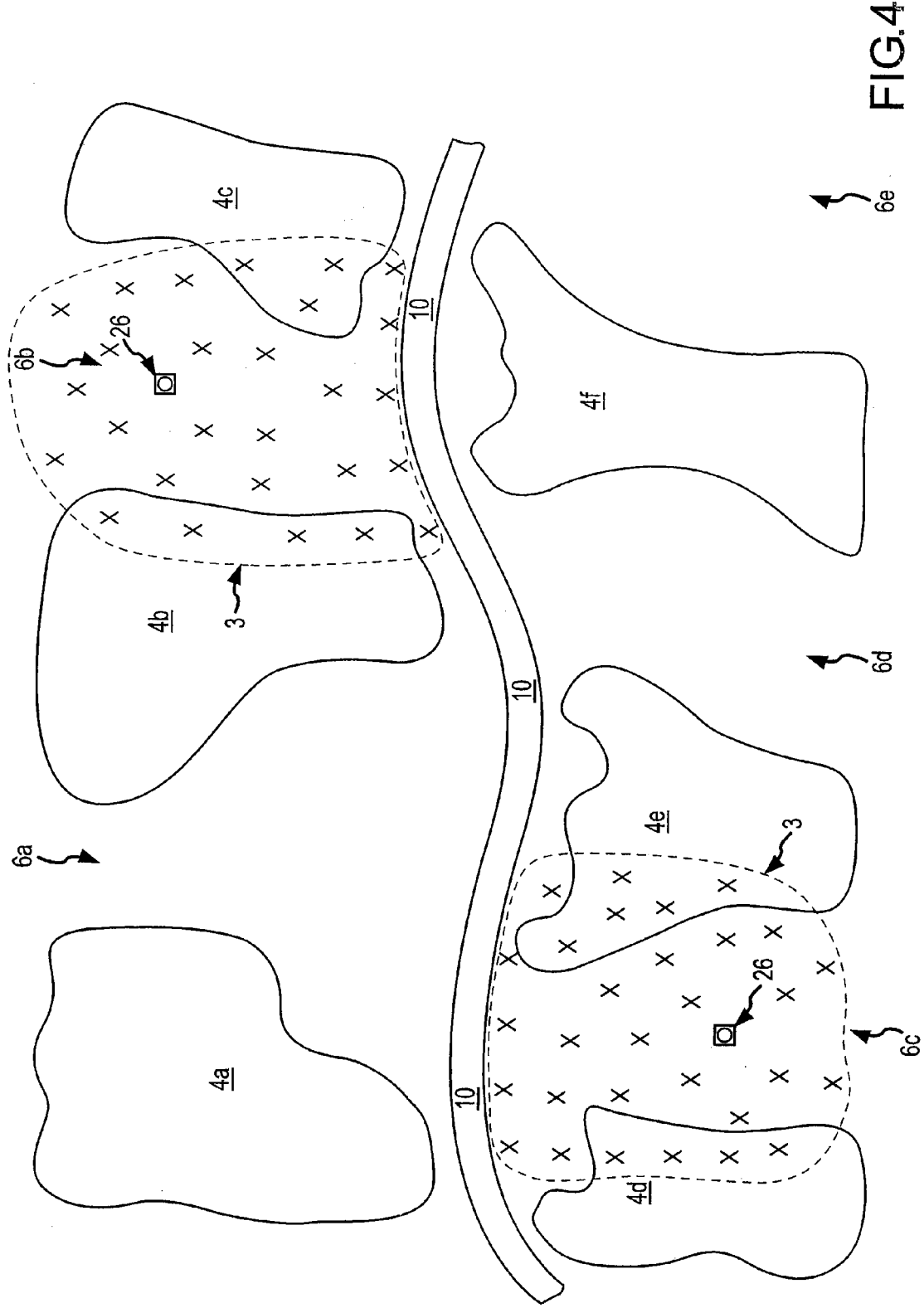
FIG. 4 is a map showing the foraging distribution of ungulates within the mosaic burn area illustrated in FIGS. 2 and 3 during a second supplementation period.

The method, in one embodiment, will now be explained by referring to a series of maps (FIGS. 2, 3 and 4) that illustrate how the foraging distribution of ungulates is shifted to reduce ungulate foraging pressure on the burned sub-areas of a mosaic burn area. FIG. 2 is a map showing the natural, preferred foraging or grazing distribution 3 of ungulates X within a mosaic burn area 2 of a foraging area. FIG. 3 is a map showing the foraging distribution 3 of ungulates X within the mosaic burn area 2 illustrated in FIG. 2 during a first supplementation period. FIG. 4 is a map showing the foraging distribution 3 of ungulates X within the mosaic burn area 2 illustrated in FIGS. 2 and 3 during a second supplementation period.

As shown in FIG. 2, the mosaic burn area 2 includes burned sub-areas 4a, 4b, 4c, 4d, 4e, 4f and unburned sub-areas 6a, 6b, 6c, 6d, 6e. Streams 10, hills, cliffs, valleys topographical features may be found within the mosaic burn area 2. Also, the foraging area containing the mosaic burn area 2 may be prairie, foothills, mountains, forest, desert, etc., or any combination of these types of foraging environments.

As indicated in FIG. 2, ungulates X, such as cattle, sheep, goats, lamas, horses, deer, elk, and bison, naturally tend to congregate in the burned sub-areas 4 once new plant growth begins to appear. This is because the ungulates X prefer the fresh new growth that develops in the burned sub-areas 4 during the growth periods following the period of burning that created the burned sub-areas 4. As a result, the burned sub-areas 4 often become over-utilized (i.e., overgrazed) and the adjacent unburned sub-areas 6 are underutilized. Vegetation in burned sub-areas 4 often has difficulty reestablishing because the excessive presence of ungulates in the burned sub-areas 4 results in the new growth being consumed or trampled before it can become mature and produce seed.

As shown in FIG. 2, the natural, preferred foraging distribution 3 of the ungulates X encompasses the burned sub-areas 4 and small portions of the unburned sub-areas 6 that exist between the burned sub-areas 4 and the stream 10. These small portions of the unburned sub-areas 6 end up within the natural, preferred foraging distribution 3 because ungulates X forage as they travel back and forth between the burned sub-areas 4 and the stream 10. Thus, as illustrated in FIG. 2, because of the ungulate' preference for the fresh new growth within the burned sub-areas 4, the natural, preferred foraging distributions 3 of the ungulates X essentially exclude the non-burned sub-areas 6 and essentially focus on the burned sub-areas 4 and immediately adjacent riparian areas. Thus, the burned sub-areas 4 and the immediately adjacent riparian areas are under substantial ungulate foraging pressure.

As illustrated in FIG. 3, to employ one embodiment of the subject invention, a person, such as a rancher, government land manager, environmentalist, etc., identifies or selects one or more unburned sub-areas 6 within the mosaic burn area 2 that are to be encompassed by the foraging distribution 3 of the ungulates X (block 100 of FIG. 1). The person can identify the burned and unburned sub-areas 4, 6 within a mosaic burn area 2 by visiting the mosaic burn area 2 and making a visual inspection. Other embodiments of this invention use more advanced detection methods to identify the burned and unburned sub-areas 4, 6. These methods include aerial photography and satellite imagery.

As indicated in FIG. 3, the person inspects the selected unburned sub-areas 6 to choose one or more locations within the unburned sub-areas 6 where a supplement 26 can be located. The supplement 26 (e.g., an ingestible such as a highly-palatable, portable, self-limiting, animal feed supplement of the type described later in this specification) is then provided at the selected location (block 105 of FIG. 1). During this supplementation period, the supplement 26 attracts ungulates X to the unburned sub-areas 6a, 6d where the supplement is located (block 110 of FIG. 1).

As shown in FIG. 3, during the supplementation period, the foraging distribution 3 of the ungulates X shifts to encompass the selected unburned sub-areas 6a, 6d where the supplement 26 is located (block 115 of FIG. 1). This reduces the ungulate' utilization of the burned sub-areas 4 and increases the ungulate' utilization of the unburned sub-areas 6, thereby preventing overgrazing of the burned sub-areas 4, reducing traffic on the immediately adjacent riparian areas, and preventing the wasting of forage in the unburned sub-areas 6.

In other embodiments of the invention, a person will attract the ungulates X from the burned sub-areas 4 to the unburned sub-areas 6 by placing other types of ingestibles 26 at one or more locations within one or more unburned sub-areas 6. For the purpose of this specification, an ingestible 26 is any substance meant to be ingested by ungulates X. For example, an ingestible 26 could be water, livestock cake, beet pulp, silage, hay, straw, grain, chemically hardened blocks, protein blocks, pressed blocks, solid, liquid or granular feed supplements, mineral blocks, granular mineral supplements, salt blocks, granular salt supplements, or a highly palatable, portable, self-limiting, animal feed supplement of the type described later in this specification. In one embodiment, the ingestibles 26 will attract the ungulates X to the one or more unburned sub-areas 6. In one embodiment, the ingestibles 26 will also increase the presence (i.e., dwell time) of the ungulates X in the one or more unburned sub-area 6. In other words, the ingestibles 26 help to hold the ungulates X in the unburned sub-area 6 and encourage the ungulates X to repeatedly return to the unburned sub-area 6.

The subject invention will be more effective in reducing ungulate foraging pressure on the burned sub-areas 4 when consideration is given to the relationship between the location of the supplement 26 and the topography, water supplies 10, and burn pattern of the mosaic burn area 2. For example, as shown in FIG. 3, the supplements 26 are approximately centered in the wide areas of the selected unburned sub-areas 6a, 6d. This helps to ensure that the foraging distribution 3 is centered on the selected unburned sub-areas 6a, 6d while minimizing foraging pressure on the adjacent burned sub-areas 4a, 4b, 4e, 4f. Also, the supplements 26 are positioned relative to the stream 10 so the ungulates X, as much as possible, are encouraged to travel across the selected unburned sub-areas 6a, 6d, as opposed to the adjacent burned sub-areas 4a, 4b, 4e, 4f. Finally, the supplements 26 are located on opposite sides of the stream 10 and at different locations along the length of the steam 10. This helps the attractive nature of the supplement 26 to be felt by the ungulates X over a broader portion of the mosaic burn area 2.

The number of locations within a mosaic burn area 2 where supplements 26 are provided during any one supplementation period will depend on the topography, water supplies, burn pattern, and size of the mosaic burn area 2. For example, small, less rugged mosaic burn areas 2 with less erratic burn patterns may only require one supplement deployment location 26 per supplementation period for optimum results. Conversely, and as illustrated in FIGS. 3 and 4, large, rugged mosaic burn areas 2 with erratic burn patterns may require more than one supplement deployment location 26 per supplementation period for optimum results.

A study shows that cattle (i.e., ungulates X) will spend approximately 70 percent of their time within 600 yards of the low moisture, molasses-based supplement block that is disclosed later in this specification. The study also shows that cattle will spend approximately 50 percent and 30 percent of their time within 400 yards and 200 yards, respectively, of the supplement block. Finally, the study shows that cattle will spend approximately 20 percent of their time within 100 yards of the supplement block. For more information about this study, see "Effectiveness of Low-Moisture Molasses Blocks and Conventional Formulations for Delivering Supplemental Minerals to Cattle on Rangelands," D. W. Bailey, Northern Agriculture Research Center, Montana State University (2001), which is hereby incorporated by reference in its entirety.

In one embodiment of the subject invention, the aforementioned distances are taken into consideration when locating the supplement 26. For example, in one embodiment, the supplement 26 is positioned within an unburned sub-area 6 so the supplement 26 is at least approximately 600 yards from the nearest burned sub-area 4. In another embodiment, the supplement 26 is positioned within an unburned sub-area 6 so the supplement 26 is at least approximately 400 yards from the nearest burned sub-area 4. In another embodiment, the supplement 26 is positioned within an unburned sub-area 6 so the supplement 26 is at least approximately 200 yards from the nearest burned sub-area 4. In another embodiment, the supplement 26 is positioned within an unburned sub-area 6 so the supplement 26 is at least approximately 100 yards from the nearest burned sub-area 4.

The subject invention is more effective when the supplement 26 is only provided in a few of the unburned sub-areas 6 and periodically rotated from one unburned sub-area 6 to another unburned sub-area 6 (as previously explained, the number of locations within a mosaic burn area 2 where supplement 26 is deployed during any single supplementation period will depend on the topography, water supplies, burn pattern, and size of the mosaic burn area 2). For example, FIG. 4 shows a second supplementation period where the supplement 26 has been relocated from the first selected unburned sub-areas 6a, 6d to newly selected unburned sub-areas 6b, 6c. Thus, during the second supplementation period, the ungulate foraging distributions 3 shift from being centered on the first selected unburned sub-areas 6a, 6d to being centered on the second selected unburned sub-areas 6b, 6c.

Relocating the supplement 26 from one location to another location within an unburned sub-area 6 and/or from one unburned sub-area 6 to another unburned sub-area 6, prevents the ungulates X from overgrazing the forage in the unburned sub-areas 6 where the supplement 26 is located and from ignoring the forage in the remaining un-burned sub-areas 6. Relocating the supplement 26 also more effectively spreads the ungulate' grazing across all of the burned and unburned sub-areas 4, 6. Also, relocating the supplement 26 lowers the initial capital cost because the person providing the supplement 26 does not need to stock as many supplement locations. Grazing equalization between the burned and unburned sub-areas 4, 6 can also be more effective when the supplement 26 is provided in an unburned sub-area 6 from which the ungulates X can periodically travel to a source of water 10.

In one embodiment, the supplement 26 is relocated to a new location when the forage in the areas surrounding the first location is grazed to a predetermined level. For example, in one embodiment of the invention, a person may move the supplement 26 from a first location within an unburned sub-area 6 to a second location within the same or different unburned sub-areas 6 when the forage in the area surrounding the first location has been lightly grazed. In another embodiment, a person may move the supplement 26 from a first location within an unburned sub-area 6 to a second location within the same or different unburned sub-areas 6 when the forage in the area surrounding the first location has been moderately grazed. In another embodiment, a person may move the supplement 26 from a first location within an unburned sub-area 6 to a second location within the same or different unburned sub-areas 6 when the forage in the area surrounding the first location has been heavily grazed. In yet another embodiment, a person may move the supplement 26 from a first location within an unburned sub-area 6 to a second location within the same or different unburned sub-areas 6 when the supplement supply in the first location has been depleted.

For the purpose of this specification, in one embodiment of the invention, lightly grazed is approximately less than 25 percent utilization of the available forage, moderately grazed is approximately 25 percent to approximately 75 percent utilization of the available forage, and heavily grazed is approximately greater than 75 percent utilization of the available forage. In one embodiment, the extent of the utilization is based on multiple representative transects for stubble height collections that are 100 yards or meters in length. In one embodiment, the extent of the utilization is determined by converting plant height to percent utilization with height-weight forage curves as are known in the art. In one embodiment, plant heights are collected along utilization transects near the supplement location prior to placement of the supplement 26 and then again after the supplement, 26 has been deployed for a predetermined period, such as five days, seven days, 10 days, etc.

In another embodiment, the extent of the utilization is based on the observations and judgment of one skilled in the art, such as an experienced rancher, range scientist, government land manager, environmentalist, etc. In other words, one skilled in the art would view the first supplement location and would determine, based on his experience and judgment, that the forage in the area surrounding the first supplement location has been sufficiently grazed to warrant moving the supplement 26 from the first supplement location to the second supplement location.

As indicated in FIGS. 3 and 4, and depending on the topography, water supplies, burn pattern, and size of the mosaic burn area 2, the supplement 26 may be provided in more than one location during a supplementation period. When this is done, the supplement 26 should be placed in equivalent locations. Equivalence occurs in areas where the ungulates X use the supplement 26 at an approximately equal rate.

Equivalent locations can be identified by monitoring the amount of supplement 26 consumed at a particular location and moving its location accordingly. For example, where the supplement 26 is provided in a container, a rancher can periodically measure the distance between the top of the container and the top surface of the supplement 26 to track the rate at which the supplement 26 is being consumed at each location. In one embodiment, the interior side of the container may have graduated measurement lines that are exposed as the supply of supplement 26 decreases within the container. The rancher can then track the rate at which the supplement 26 is consumed by periodically reading the graduated measurement lines. In one embodiment, a clock is mounted on the container. The clock counts the number of days since the container of supplement 26 was deployed.

The animal feed supplement 26, used in one embodiment of the subject invention, is made from a highly palatable, consumption limited material. Palatability refers to the extent that the ungulates X desire the product and is related to the product's taste and nutrition content. Highly palatable supplements 26 are preferred over natural forage, because they encourage ungulates X to travel greater distances to consume the product.

Consumption limits prevent ungulates X from satisfying their craving for the product in one feeding session. Consumption limits can be imposed by choosing a supplement material that cannot be consumed rapidly (i.e., a "self-limiting supplement") or by using a mechanical apparatus to limit the supplement's availability. Consumption limited supplements 26 are desirable, because they encourage the ungulates X to spend more time around the supplement source.

The combination of highly palatability and limited consumption is particularly desirable for the present application, because it causes the ungulates X to travel significant distances to the supplement 26, to remain in the unburned sub-area 6, and to consume the local forage between their repeated limited consumption of the supplement 26. In one embodiment of the subject invention, a suitable supplement 26 could be a molasses product that is dehydrated to reduce the moisture content and fortified with vitamins, minerals, and other protein sources. Other suitable supplements 26 include, but are not limited to a liquid supplement in a consumption-limiting container, a chemically hardened block, or a pressed block.

It is also desirable that the supplement 26 contains those specific proteins, fat, vitamins, macro minerals, and trace minerals that the ungulates X require for proper nutrition and/or a specific nutritional goal, such as weight gain, hoof strength, dairy production, etc. Studies have shown that the protein content of the forage limits the animal's weight gain because low protein levels reduce consumption and suppress microbial fermentation in the animal's digestive system. Nutrition supplements have also been shown to improve the overall body condition and the reproductive performance of the ungulates X.

The preferred embodiment of the supplement (i.e., ingestible) used with this invention is based on a solid feed supplement 26 sold under the trade name CRYSTALYX® BGF-30 by Hubbard Feeds, Inc., P.O. Box 8500, 424 North Riverfront Drive, Mankato, Minn. 56001. CRYSTALYX® BGF-30 is a molasses-based supplement block manufactured to be fed to cattle free choice. It contains molasses products, hydrolyzed feather meal, plant protein products, hydrolyzed vegetable oil, processed grain by-products, urea, monocalcium phosphate, dicalcium phosphate, calcium carbonate, magnesium oxide, manganese sulfate, zinc sulfate, copper sulfate, copper chloride, ethylenediamine dihydriodide, calcium iodate, cobalt carbonate, sodium selenite, vitamin A acetate, vitamin D3 supplement, vitamin E supplement. These ingredients are dehydrated to reduce the moisture content and result in the following nutrient analysis:

| CRYSTALYX ® BGF-30 NUTRIENT ANALYSIS: | |
|---|---|
| Crude Protein, min (Including not more than 12.0% equivalent crude protein as non-protein nitrogen.) | 30.0% |
| Crude Fat, min | 4.0% |
| Crude Fiber, max | 2.5% |
| Calcium (Ca), min | 2.0% |
| Calcium (Ca), max | 2.5% |
| Phosphorus (P), min | 2.0% |
| Potassium (K), min | 2.5% |
| Magnesium (Mg), min | 0.5% |
| Cobalt (Co), min | 3.3 ppm |
| Copper (Cu), min | 330 ppm |
| Iodine (I), min | 17 ppm |
| Manganese (Mn), min | 1,330 ppm |
| Selenium (Se), min | 4.4 ppm |
| Zinc (Zn), min | 1,000 ppm |
| Vitamin A, min | 80,000 IU/lb |
| Vitamin D, min | 8,000 IU/lb |
| Vitamin E, min | 30 IU/lb |
| Salt (NaCl) | none added |

CRYSTALYX® BGF-30 has a number of beneficial properties. For example, CRYSTALYX® BGF-30 is weatherproof so that a user, such as a rancher, can leave this supplement block in the unburned sub-areas 6 without losses to wind or rain. Furthermore, the CRYSTALYX® BGF-30 block only has 2% to 6% moisture content. This is desirable because it reduces the transportation cost necessary to use the invention in remote and rugged areas. Finally, CRYSTALYX® BGF-30 improves the livestock's digestion by providing a good growth medium in the animal's rumen for the bacteria that break down vegetable material.

Other animal feed supplement formulas are within the scope of this invention, several of which are well known in the art. These supplements generally contain the following nutritional content:

| NUTRIENT ANALYSIS | MINIMUM | MAXIMUM |
|---|---|---|
| Crude Protein | 4.0% | 65.0% |
| Crude Fat | 2.0% | 12.0% |
| Crude Fiber | 0.5% | 4.0% |
| Calcium (Ca) | 0.4% | 10.0% |
| Phosphorus (P) | 0% | 10.0% |
| Salt (NaCl) | 0% | 10.0% |
| Potassium (K) | 0.5% | 6.0% |
| Magnesium (Mg) | 0.15% | 6.0% |

-continued

| NUTRIENT ANALYSIS | MINIMUM | MAXIMUM |
| --- | --- | --- |
| Cobalt (Co) | 1.0 ppm | 15 ppm |
| Copper (Cu) | 15 ppm | 1,000 ppm |
| Iodine (I) | 2.0 ppm | 100 ppm |
| Manganese (Mn) | 25 ppm | 3,000 ppm |
| Selenium (Se) | 0 ppm | 30 ppm |
| Zinc (Zn) | 25 ppm | 3,400 ppm |
| Vitamin A | 0 IU/lb | 200,000 IU/lb |
| Vitamin D | 0 IU/lb | 40,000 IU/lb |
| Vitamin E | 0 IU/lb | 1,000 IU/lb |
| Non-protein Nitrogen | 0% | 52% |

The actual nutrient content depends on whether the supplement is designed to have high protein, low protein, and/or trace mineral fortification.

In one embodiment of the invention, the animal feed supplement 26 is provided in the first unburned sub-area 6 at a weekly rate of approximately 0.7 to approximately 10.5 pounds of supplement per bovine animal unit. In one embodiment, the animal feed supplement 26 is a liquid provided in the first unburned sub-area 6 at a weekly rate of approximately 10.5 to approximately 35 pounds of supplement per bovine animal unit.

In one embodiment, the animal feed supplement 26 is a liquid provided in the first unburned sub-area 6 at a weekly rate of approximately 5.2 to approximately 17.5 pounds of dry matter supplement per bovine animal unit. In one embodiment, the animal feed supplement 26 is a pressed block or chemically hardened block provided in the first unburned sub-area 6 at a weekly rate of approximately 1.4 to approximately 31 pounds of dry matter supplement per bovine animal unit. It should be noted that the aforementioned "dry matter" rates are the equivalents of what the rates would be if substantially all of the moisture were removed from a supplement supplied in liquid, pressed block or chemically hardened form.

The animal feed supplement 26 used in this invention should be provided in a container 28 such as that shown in FIG. 5. This container 28 is generally configured into a barrel shape having an open top 30, a sidewall 32, a bottom 34, a protruding bottom lip 36, and a top edge 38. The open top 30 should be large enough to allow easy access to the supplement 26 and the bottom 34 should be wide enough to prevent ungulates X (e.g., livestock) from tipping the container 28. The top edge 38 is preferably formed into a rounded shape that prevents livestock X from injuring themselves when consuming the supplement 26.

The weight of the container 28 and of the supplement 26 drives the protruding lip 36 into the ground 40. This feature makes the container 28 particularly desirable for use on steeply sloped hillsides because it deters sliding motion caused by livestock X or by gravity in snow, ice, mud, or other slippery conditions. Making the supplement 26 essentially immovable by livestock X even when the container 28 is almost empty helps insure that the livestock-attracting focus remains in the same location in the unburned sub-areas 6. However, the size and weight should be consistent with the need to deliver the filled containers 28 to somewhat remote terrain.

The preferred embodiment uses a steel half-barrel that is offered in sizes up to approximately 250 pounds of supplement. One advantage of this embodiment is that the steel construction prevents livestock X from biting or trampling the supplement 26. This enhances the self-limiting feature of the preferred supplement formula. Another advantage of the preferred embodiment is its ability to be recycled. Despite these advantages, however, other embodiments are possible. For example, the container 28 could be made from plastic, cardboard, or aluminum instead of steel and the rounded top edge 38 could be replaced by a plastic protector. Other container sizes, shapes, and materials consistent with the above objectives are also within the scope of this invention.

The effectiveness of this invention increases if the ungulates X (e.g., livestock) develop an association between the supplement 26 and an identifier associated with the supplement. Although a wide variety of features can function as an identifier, an effective identifier should be capable of signaling the location of the supplement 26 to the livestock X over a significant distance. This association need only be trained into a portion of the herd. The rest of the animals will naturally develop the association, because livestock X are naturally drawn towards other livestock X. That is, the existence of a crowd of livestock X will draw additional livestock to that location.

One possible identifier is the color of the supplement container 28. Although this color can be any shade that ungulates X (e.g., livestock) can perceive, it is desirable that the color contrasts with the container's surroundings throughout the year. Black and/or blue containers appear to be easily perceived both in snow and in rangeland having light brown color tones. The dark colors, like black and blue, are also desirable because they absorb solar energy. This causes the container to melt into any underlying snow or ice 42 and helps the container 28 remain where the rancher placed it.

Another possible identifier is the odor of the supplement 26. Although this odor can be any scent that ungulates X (e.g., livestock) can perceive, it is desirable that the odor be relatively unusual. This will prevent the ungulates X from confusing the identifier odor with naturally occurring scents. One embodiment of this invention uses onion by-products to produce an onion odor identifier.

A third possible identifier is a sound. Like color or odor identifiers, sonic identifiers can be anything perceivable by ungulates X (e.g., livestock). However, it is desirable that the identifying noise be easily distinguishable from naturally occurring sounds. In one embodiment of this invention, a flexible pole 46 is attached to the container 28 by supports 48 and 50. A bell 52 is attached to the flexible pole 46 opposite the supports 48 and 50. Livestock X hit the pole 46 while feeding on the supplement 26 and cause the bell 52 to ring. This sound alerts other livestock X to the supplement's location and to the presence of other animals. These two factors combine to draw the other livestock X to the unburned sub-area 6. Other embodiments of this invention replace the bell 52 with a wind-chime. The wind-chime alerts livestock X to the supplement's location whenever the wind blows.

It will be easier to establish the initial connection between the ungulates X (e.g., livestock) and the supplement 26 if the identifier is naturally attractive to the livestock X. That is, a naturally attractive container (color or configuration) or sound may appeal to the curiosity of an animal X that has not previously experienced the supplement 26 and draw its presence for a taste. Similarly, a naturally attractive odor may lure the livestock X to the supplement 26 and cause it to try the product. These initial tastes will establish the desirability of the product. The onion odor used in one embodiment of this invention is one such naturally attractive identifier.

The natural instinct of some ungulates X (e.g., livestock) to congregate can also be used to enhance the effectiveness of this invention. As shown in FIG. 6, a decoy 54 can be attached (preferably, removably attached) to the container 28. The decoy 54 will initially attract livestock X to the supplement location. This, in turn, will attract additional animals to the unburned sub-area 6. Solar-powered sound sources and/or lights (e.g., blinking LED's) can also be used as attractants and identifiers.

The previously-described embodiments of the subject invention present an effective method of controlling grazing distribution of ungulates X that allows the beneficial grazing of burned sub-areas 4 within a mosaic burn area 2 without overgrazing the burned sub-areas 4. The effectiveness of the method of the subject invention in modifying the natural ungulate grazing distribution has been demonstrated in two studies.

The first study was conducted by the Montana State University to determine whether the natural livestock grazing distribution could be improved by strategically placing low moisture, molasses-based supplement blocks 26 in areas within a grazing area that where historically underutilized by livestock X. Livestock X, such as cattle X, naturally avoid areas that are located far from water and/or that require them to climb steep slopes. This tendency causes the cattle to overgraze lowland riparian areas while ignoring abundant or high quality forage in areas far from water or associated with steep slopes.

The research team divided a study area into pastures having easy, moderate, difficult, and inaccessible terrain. The study further divided the pastures having moderate and difficult terrain into control and supplement sites. The research team provided a CRYSTALYX® BGF-30 block in the supplement sites. Every seven to ten days, the research team moved the supplement 26 to new locations.

The study compared the cattle's use of the control and supplement sites by measuring forage utilization and fecal pat abundance before supplementation and after removal. The researchers observed more cattle X in areas with the supplement 26 (32±8%) than in control areas (3±2%). They also measured an increase in the number of fecal pats (3.3±7 pats/100 $m^2$ vs. 0.5±0.5 pats/100 $m^2$) and in forage utilization (17±2% vs. −1±1%) in areas containing supplement. These results indicate that the natural livestock grazing distribution can be improved by strategically placing low moisture molasses-based supplement blocks 26 within a grazing area. For more information about this study, see Bailey & Welling, J. Anim. Sci., Vol. 76, Suppl. 1, p. 191 (1998), which is hereby incorporated by reference in its entirety.

The second study was conducted to determine whether the natural livestock grazing distribution in mosaic burn areas 2 could be improved by strategically placing low moisture, molasses-based supplement blocks 26 in unburned sub-areas 6 within the mosaic burn area 2. As previously discussed, ungulates X, such as livestock, tend to overgraze burned sub-areas 4 of a mosaic burn area 2. This results from the ungulate' natural preference for the fresh new growth that develops in the burned sub-areas 4 the following growth period. As the ungulates X overgraze the burned sub-areas 4, they tend to ignore the old cured and dead forage in the adjacent unburned sub-areas 6, which is often abundant and/or high quality forage.

In the second study, the research team provided CRYSTALYX® BGF-30 blocks in supplement sites located within unburned sub-areas 6 of a mosaic burn area 2. The blocks were moved to new supplement sites after the blocks were completely consumed by the cattle. Two moves occurred, after which samples were taken. The percent utilization at block placement sites at the end of each sample period averaged 23 percent while the percent utilization at key areas located away from block placement sites at the end of each sampling period was an average of eight percent less than block placement sites. These results indicate that the natural livestock grazing distribution in mosaic burn areas 2 can be improved by strategically placing low moisture, molasses-based supplement blocks 26 within the unburned sub-areas 6 of a mosaic burn area 2. For more information about this study, see Use of Dehydrated Molasses Blocks to Promote Uniform Utilization Between Burned and Unburned Areas of a Summer Pasture Two Years Post-Burn, Tracey K. Brewer, (Nov. 27, 2002), which is hereby incorporated by reference in its entirety.

Although the present invention has been described in considerable detail with reference to certain preferred embodiments thereof, variations are possible. For example, this invention could be optimized for use with many types of ungulate animals, such as cattle, sheep, goats, lamas, horses, deer, elk, and bison, by switching the animal feed supplement 26 to a formula that appeals to that particular species. Appropriate supplements, such as CRYSTALYX® STABLE-LYX® for horses and CRYSTALYX® SHEEP-LYX® for sheep, are well known in the art. The animal feed supplement described in this invention could also include compounds designed to increase livestock performance, such as ingestible hormones, antibacterial drugs, or stimulants. Therefore, the spirit and scope of the appended claims should not be limited to the description of the preferred versions contained herein.

I claim:

1. A method of reducing ungulate pressure on a burned sub-area within a mosaic burn area, the method comprising:
   identifying a first unburned sub-area within the mosaic burn area; and
   providing at least one highly palatable, portable, self-limiting, animal feed supplement in the first unburned sub-area to attract the ungulates to the first unburned sub-area and to increase a length of stay of the ungulates in the first unburned sub-area, the supplement causing the ungulates to be attracted to the first unburned sub-area in preference to the burned sub-area with new growth.

2. The method of claim 1 further comprising providing a highly-palatable, portable, self-limiting, animal feed supplement in a second unburned sub-area once the supplement in the first unburned sub-area is exhausted.

3. The method of claim 1 further comprising relocating the animal feed supplement to a second unburned sub-area once the first unburned sub-area has been grazed to a predetermined level.

4. The method of claim 3 wherein the predetermined level of grazing is lightly grazed.

5. The method of claim 3 wherein the predetermined level of grazing is moderately grazed.

6. The method of claim 3 wherein the predetermined level of grazing is heavily grazed.

7. The method of claim 1 wherein the ungulates are selected from the group consisting of cattle, sheep, goats, lamas, horses, deer, elk, and bison.

8. The method of claim 1 wherein the ungulates are cattle and the animal feed supplement is provided in the first unburned sub-area at a weekly rate of approximately 0.7 to approximately 10.5 pounds of supplement per animal unit.

9. The method of claim 1 wherein the ungulates are cattle and the animal feed supplement is a liquid provided in the first unburned sub-area at a weekly rate of approximately 10.5 to approximately 35 pounds of supplement per animal unit.

10. The method of claim 1 wherein the ungulates are cattle and the animal feed supplement is a liquid provided in the first unburned sub-area at a weekly rate of approximately 5.2 to approximately 17.5 pounds of dry matter supplement per animal unit.

11. The method of claim 1 wherein the ungulates are cattle and the animal feed supplement is a block provided in the first unburned sub-area at a weekly rate of approximately 1.4 to approximately 31 pounds of dry matter supplement per animal unit.

12. A method of modifying the natural foraging patterns of ungulates within a mosaic burn area that includes burned and unburned sub-areas, the method comprising identifying a first unburned sub-area within a mosaic burn area; and supplying in said first unburned sub-area an ingestible adapted to be ingested by ungulates.

13. The method of claim 12 wherein the ingestible attracts the ungulates to the first unburned sub-area.

14. The method of claim 12 wherein the ingestible increases the duration of presence of the ungulates in the first unburned sub-area.

15. The method of claim 12 wherein the ingestible is selected from the group consisting of water, livestock cake, beet pulp, grain, silage, hay, and straw.

16. The method of claim 12 wherein the ingestible is selected from the group consisting of chemically hardened blocks, protein blocks, pressed blocks, liquid feed supplements, and granular feed supplements.

17. The method of claim 12 wherein the ingestible is selected from the group consisting of mineral blocks, granular mineral supplements, salt blocks, and granular salt supplements.

18. The method of claim 12 wherein the ingestible is a highly palatable, portable, self-limiting, animal feed supplement.

19. The method of claim 12 further comprising supplying the ingestible in a second unburned sub-area once the ingestible in the first unburned sub-area is exhausted.

20. The method of claim 12 further comprising supplying the ingestible in a second unburned sub-area once the first unburned sub-area has been grazed to a predetermined level.

21. The method of claim 20 wherein the predetermined level of grazing is lightly grazed.

22. The method of claim 20 wherein the predetermined level of grazing is moderately grazed.

23. The method of claim 20 wherein the predetermined level of grazing is heavily grazed.

24. The method of claim 12 wherein the ungulates are selected from the group consisting of cattle, sheep, goats, lamas, horses, deer, elk, and bison.

25. A mosaic burn area adapted to reduce pressure by ungulates on a burned sub-area within the mosaic burn area, the mosaic burn area comprising:
an unburned sub-area within the mosaic burn area; and
a highly palatable, portable, self-limiting, animal feed supplement located in the unburned sub-area,
wherein the animal feed supplement is adapted to attract the ungulates to the unburned sub-area and to increase a length of stay of the ungulates in the unburned sub-area.

26. The mosaic burn area of claim 25, further comprising an ungulate located within the unburned sub-area.

27. The mosaic burn area of claim 26, wherein the ungulate is selected from the group consisting of cattle, sheep, goats, lamas, and horses.

28. The mosaic burn area of claim 26, wherein the ungulate is selected from the group consisting of deer, elk, and bison.

29. The mosaic burn area of claim 26, wherein the ungulate is a bovine.

* * * * *